(12) United States Patent
Sausse et al.

(10) Patent No.: US 7,946,116 B2
(45) Date of Patent: May 24, 2011

(54) TURBOCHARGER COMPRISING A VARIABLE NOZZLE DEVICE

(75) Inventors: Lorrain Sausse, Thaon les Vosges (FR); Denis Jeckel, Thaon les Vosges (FR); Giorgio Figura, Thaon les Vosges (FR); Eric Dechanet, Thaon les Vosges (FR)

(73) Assignee: Honeywell International, Inc., Morristown, NJ (US)

( * ) Notice: Subject to any disclaimer, the term of this patent is extended or adjusted under 35 U.S.C. 154(b) by 522 days.

(21) Appl. No.: 10/540,375

(22) PCT Filed: Sep. 5, 2002

(86) PCT No.: PCT/IB02/03589
§ 371 (c)(1), (2), (4) Date: Dec. 25, 2006

(87) PCT Pub. No.: WO2004/022926
PCT Pub. Date: Mar. 18, 2004

(65) Prior Publication Data
US 2007/0130943 A1 Jun. 14, 2007

(51) Int. Cl.
*F02B 33/44* (2006.01)

(52) U.S. Cl. .......... 60/602; 123/564
(58) Field of Classification Search ......... 60/605.1–612; 123/559.1–566
See application file for complete search history.

(56) References Cited

U.S. PATENT DOCUMENTS

| | | | | |
|---|---|---|---|---|
| 4,907,952 | A * | 3/1990 | Inoue et al. | 417/407 |
| 5,025,629 | A * | 6/1991 | Woollenweber | 60/600 |
| 5,207,565 | A * | 5/1993 | Roessler | 417/407 |
| 5,441,383 | A * | 8/1995 | Dale et al. | 415/158 |
| 6,314,736 | B1 * | 11/2001 | Daudel et al. | 60/602 |
| 6,739,134 | B2 * | 5/2004 | Fledersbacher et al. | 60/602 |
| 6,925,805 | B2 * | 8/2005 | Koch et al. | 60/602 |
| 7,024,855 | B2 * | 4/2006 | Perrin et al. | 60/602 |
| 7,150,151 | B2 * | 12/2006 | Mulloy et al. | 60/602 |

* cited by examiner

*Primary Examiner* — Thomas Denion
*Assistant Examiner* — Douglas J. Duff
(74) *Attorney, Agent, or Firm* — Alston & Bird LLP

(57) ABSTRACT

A turbocharger comprises a variable nozzle device and an exhaust housing being mechanically and/or thermally decoupled from the variable nozzle device. Additional optional advantageous features are provided, including various axial and radial clearances and various sealing elements.

10 Claims, 5 Drawing Sheets

TURBOCHARGER COMPRISING A VARIABLE NOZZLE DEVICE

The present invention relates to a turbocharger comprising a variable nozzle device.

In turbochargers the regulation of the exhaust gas flow driving the turbine is often necessary in order to improve the efficiency of the turbocharger which is used under different operational conditions. In order to achieve such a control of the gas flow, there is provided a variable nozzle device comprising nozzle passages of variable geometry. The nozzle passages are formed between vanes arranged circumferentially around the turbine between an inner nozzle wall and an outer nozzle wall. The vanes are pivotable in order to provide different configurations of the nozzle passages and thus to control the exhaust gas flow driving the turbine.

According to document WO-A1-0206637, there is known a turbocharger comprising a variable nozzle mechanism formed as a cartridge coupled to a center housing of the turbocharger, wherein the exhaust housing is mounted to the cartridge and made of sheet metal.

It is the object of the present invention to provide an improved turbocharger, in particular a turbocharger more efficiently produced and maintained and having increased reliability.

According to one technical solution of this object, there is provided a turbocharger according to the features defined in claim 1. Preferable embodiments of such a turbocharger are set forth in the subclaims.

An advantage of the invention set forth in claim 1 is in particular that the transmission of a mechanically and thermally created load from the exhaust housing to the components of the variable nozzle device is efficiently avoided. This is achieved by a construction in which the exhaust housing is mechanically and/or thermally decoupled from variable nozzle device.

According to a preferable embodiment of the invention the exhaust housing of the turbocharger is mounted directly to the center housing of the turbocharger carrying a shaft with the turbine wheel, so that both housings define an inner space in which the variable nozzle device and the turbine wheel are located.

The exhaust housing of the turbocharger comprises preferably a gas inlet portion attached to the center housing and a gas outlet portion encompassing with an axially extending clearance a gas outlet portion of the variable nozzle device. In such an embodiment the gas inlet portion of the exhaust housing preferably comprises a flange member axially abutted via a sealing element to the center housing and mounted thereto by a fastening member or means.

The gas outlet portion of the variable nozzle device can be provided with a circumferential recess for accommodating a piston ring avoiding a gas leakage from the gas inlet side of the exhaust housing to the gas outlet side thereof. As an alternative or additional measure for avoiding gas leakage at least one further circumferential recess can be formed in the gas outlet portion of the exhaust housing between the gas inlet side of said exhaust housing and the piston ring.

Typically, the variable nozzle device of the turbocharger comprises an annular arrangement of vanes between a nozzle ring and an outer ring, wherein the outer ring is integrally formed with a peripheral ring fitted on the nozzle ring and fixedly mounted to the center housing. The vanes are pivotably supported on the nozzle ring and the nozzle ring is preferably axially urged by the peripheral ring against an annular disc member supported on the center housing.

As an alternative or additional decoupling measure the construction of the turbocharger according to the invention can provide that the gas inlet portion of the exhaust housing encompasses with a further axially extending clearance the peripheral ring of the variable nozzle device.

For achieving a more compact and functional construction of the turbocharger the peripheral ring of the variable nozzle device can be nevertheless abutted against the same sealing element through which the flange member of the exhaust housing is secured to the center housing.

In the following, the above and other aspects of the invention are described in more detail and illustrated by examples with reference to one embodiment shown in the attached Figures.

Figure 1:
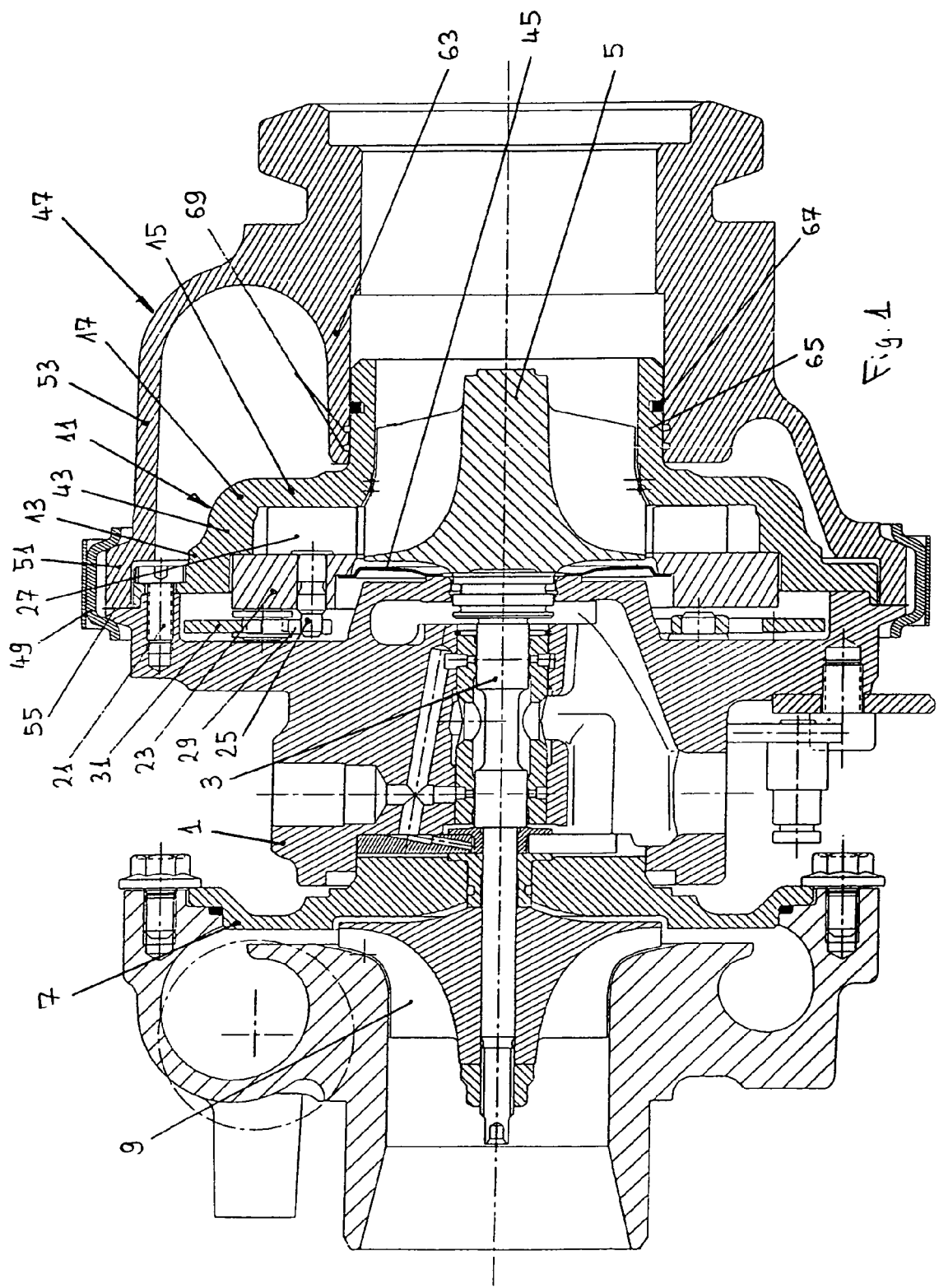
FIG. 1 shows a first cross-sectional view along the axis of an embodiment a turbocharger according to the invention.

A turbocharger according to the embodiment shown in FIG. 1 comprises a center housing 1 carrying a shaft 3 with a turbine wheel 5 attached at the one end thereof. The shaft is supported on a bearing system within the center housing 1 which although particularly illustrated in FIG. 1 is not described in detail. On the left side in FIG. 1 only a backplate 7 and a compressor impeller 9 of the turbocharger are illustrated, whereas on the right side of the center housing 1 in FIG. 1 the variable nozzle device is shown in more detail.

The variable nozzle device includes a basically ring-shaped insert 11 as an integral member comprising a peripheral ring 13 and an outer ring 15 connected with the peripheral ring by means of leg portions 17.

Figure 2:
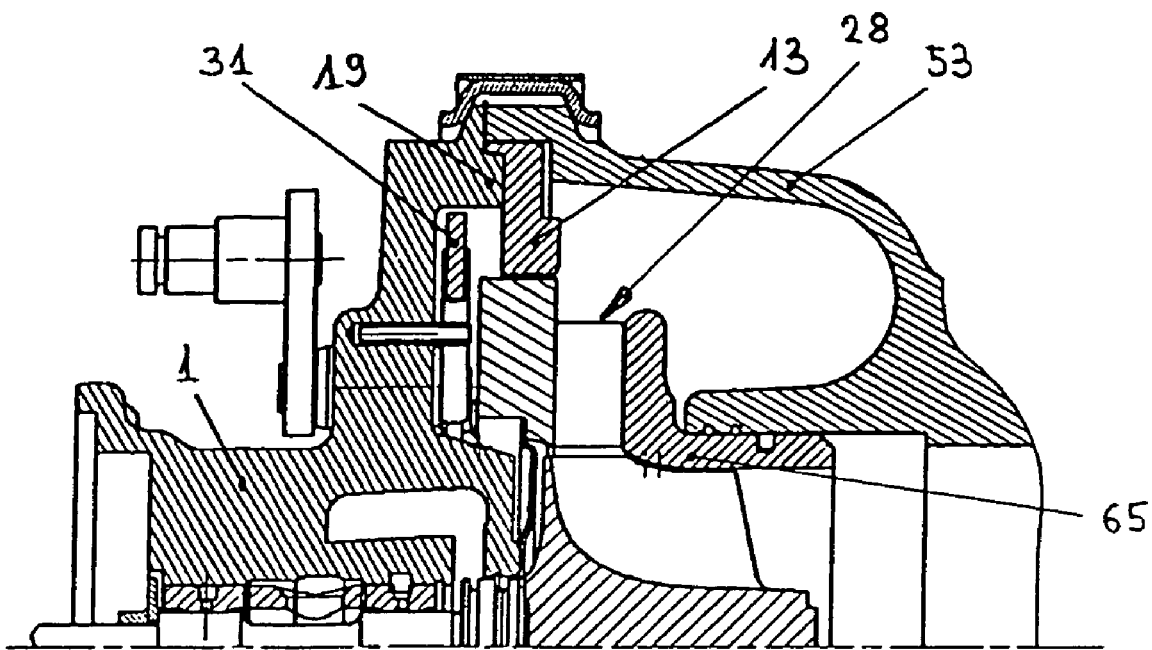
FIG. 2 shows a second cross-sectional view of the embodiment of the turbocharger according to the invention.

As shown in FIG. 2, the peripheral ring 13 of the ring shaped insert 11 is fitted on a step portion 19 of the center housing 1 and mounted thereto by means of bolts 21 (shown in FIG. 1) arranged in a circumferentially spaced manner and secured in corresponding holes of the center housing 1. Into the peripheral ring 13 a nozzle ring 23 is fitted for carrying a plurality of vane pins 25 arranged on the nozzle ring circumferentially around the turbine 5 and fixedly mounted to vanes 27 (as shown in FIG. 1).

In this embodiment of the turbocharger the leg portions 17 fulfill the function of spacers defining a nozzle space between the nozzle ring 23 forming an inner wall of the nozzle and the outer ring 15 of the ring shaped insert which forms an outer wall of the nozzle. The other end of each vane pin 25 is attached to a vane arm 29 preferably by welding. The vane arms 29 are received in slots formed in the inner periphery of an unison ring 31 which is rotatably arranged in order to pivot the vane arms 29, the vane pins and finally the vanes 27 attached thereto.

Figure 3:
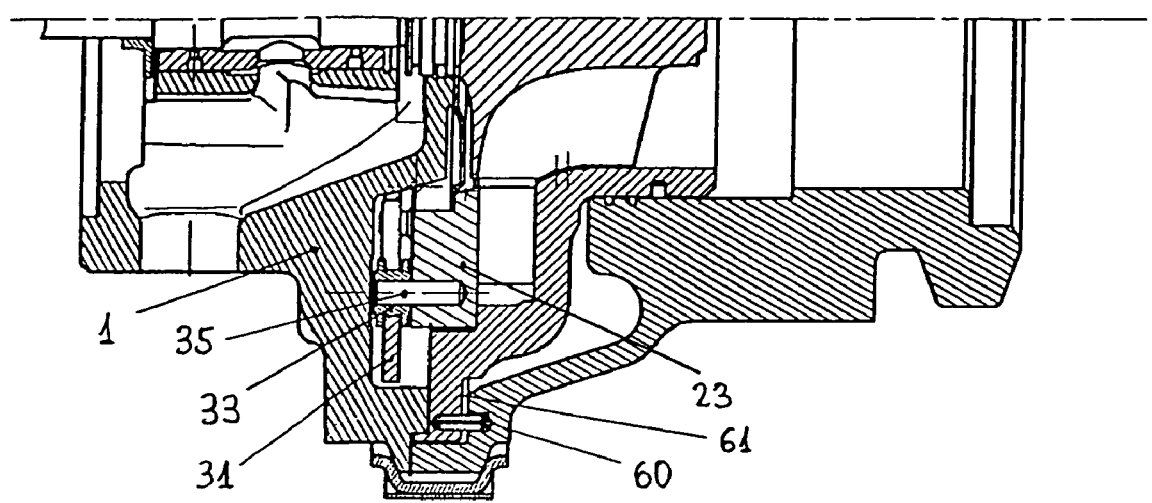
FIG. 3 shows a third cross-sectional view of the embodiment of the turbocharger according to the invention.

In order to be rotatable the unison ring 31 is supported with its inner periphery on circumferentially spaced rollers 33 best shown in FIG. 3. The rollers are rotatably mounted on dowels 35 being rotatably supported in corresponding holes formed in the nozzle ring 23. The length of the dowels 35 is such that although they can perform slight axial movement toward the center housing 1 the maximum distance between the corresponding end of the dowel and the center housing is such that the rollers 33 cannot become disengaged and remain locked between the center housing and the nozzle ring.

Figure 4:
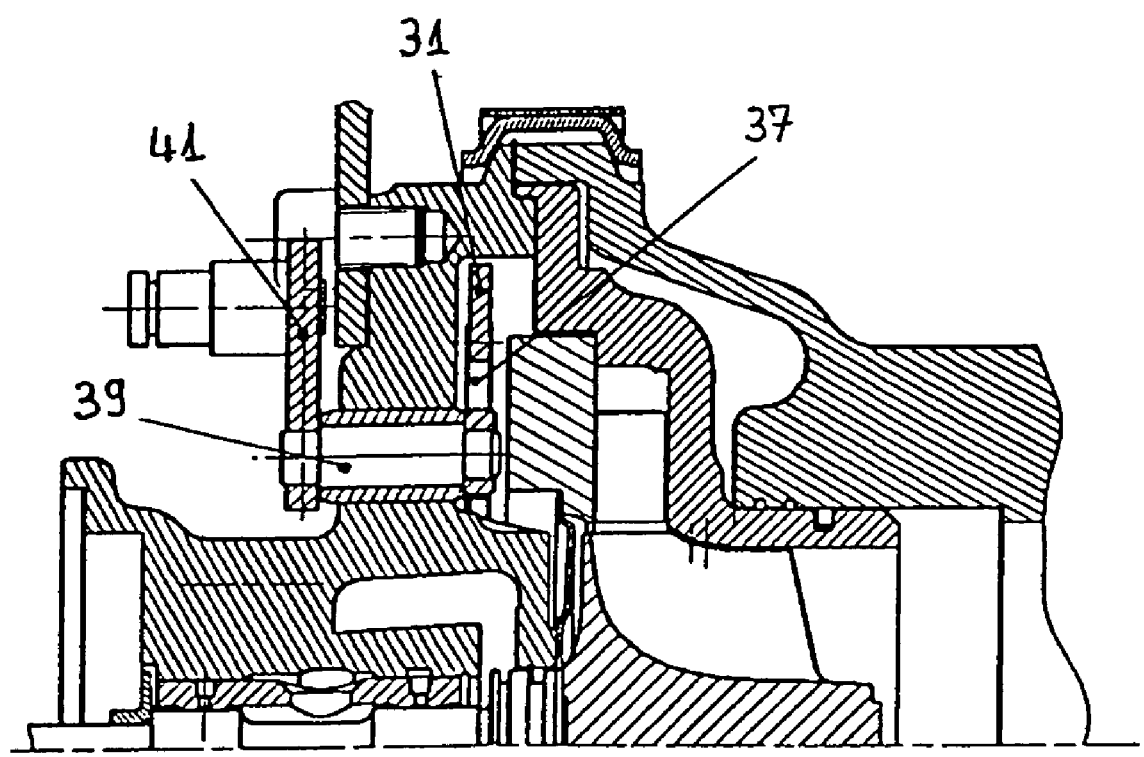
FIG. 4 shows a fourth cross-sectional view of the embodiment of the turbocharger according to the invention.

As can be particularly seen in FIG. 4 an actuating arm 37 engaging with one of the slots in the inner periphery of the unison ring 31 is connected via an actuating rod 39 to an actuator crank 41.

The ring shaped insert 11 together with the unison ring 23 fitted therein and carrying all movable elements of the vane actuating mechanism form the variable nozzle device which thus represents a kind of a cartridge attached to the center housing 1 by means of the bolts 21. With regard to this construction it is to be noted that when attaching the peripheral ring 13 of the ring shaped insert to the center housing, the nozzle ring 23 is axially clamped by a leg step portion 43 against an annular disc member 45 axially supported on the center housing 1. Thus, only by means of the bolts 21 the complete variable nozzle device is coupled to the center housing, wherein the center housing and the ring shaped insert form a kind of a stable shell protecting the movable elements of the variable nozzle device.

A turbine housing or exhaust housing 47 is mounted to the center housing 1 by means of v-bands or an equivalent fastening member 49 as shown in each of FIGS. 1 to 6. The fastening member 49 presses a flange member 51 of the inlet portion 53 of the exhaust housing against another flange portion of the center housing as can be best seen in FIG. 6. There is provided a gasket 55 between these two flange portions, said gasket serving as sealing device in order to provide gas tightness and does efficiently avoid any leakage of exhaust gas from the exhaust housing. In this embodiment the inlet portion 53 forms the volute of the exhaust housing and delivers exhaust gas to the nozzle 28 as particularly illustrated by FIG. 2.

Although in this particular embodiment of the turbocharger according to the invention the turbine housing is only axially in contact with the center housing 1 through the sealing device 55, the fastening member 49 is such that it also provides a reliable positioning of the exhaust housing also in radial direction. Thus, the exhaust housing does not need any additional fixation means.

Figure 6:
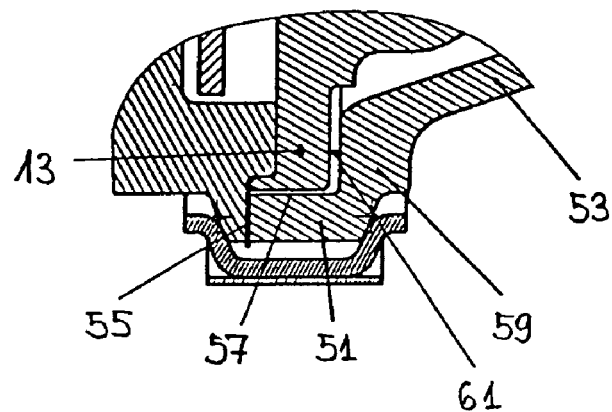

The mounting location of the flange member 51 of the exhaust housing and the peripheral ring 13 of the ring shaped insert is such that an axially extending clearance 57 is established therebetween as best seen in FIG. 6. Another radially extending portion 59 of the exhaust housing is axially spaced from the peripheral ring in order to provide another radially extending clearance 61 by means of which any contact between the exhaust housing and the ring shaped insert 11 of the variable nozzle device is avoided.

An outer gas outlet portion 63 of the exhaust housing 47 is formed as a sleeve encompassing an inner gas outlet portion 65 of the variable nozzle device, said portion 65 being formed as an axial tubular extension of the insert's outer ring 15. Between these two portions there is an axially extending clearance of preferably 0.05-0.15 mm, which is small enough to avoid gas leakage and in the same time big enough to provide appropriate mechanical decoupling between the exhaust housing and the ring shaped insert 11. As an additional sealing system to prevent gas leakage, there are provided sealing elements including a piston ring 67 interposed in a recess formed in the inner gas outlet portion 65, as well as two recesses 69 formed in the outer gas outlet portion of the exhaust housing and serving as means for damping the turbulence of gas leaking from the exhaust housing.

Figure 5:
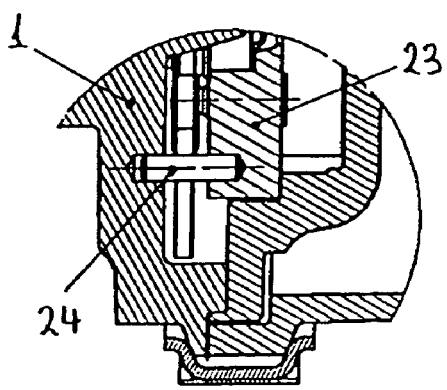
FIG. 5 and FIG. 6 show extract cross-sectional views of the turbocharger according to the invention for particularly illustrating the mounting of the exhaust housing to the center housing.

The FIGS. 1 to 6 illustrating an embodiment of the present invention reveal also further details of the turbocharger construction. For example FIG. 5 shows a locking dowel 24 which prevents the nozzle ring 23 from rotation in relation to the center housing 1. Further, FIG. 3 shows an additional elastic sealing member 60 closing the clearance 61 without impairing the mechanical and thermal decoupling between the insert and the exhaust housing.

As explained above, one aspect of the present invention is to mechanically and/or thermally decouple the exhaust housing from the variable nozzle device, since the exhaust housing is subject to high mechanical and/or thermal loads. Further, the compact hut-like insert accommodating the nozzle ring and thus forming a cartridge including all nozzle components helps to prevent nozzle component deformation and consequently prevents sticking or binding of the vanes.

Since the exhaust housing is in direct contact with the center housing through a sealing element, thus forming an inner space in which the complete variable nozzle device is located, an efficient leakage proofness of the turbocharger is achieved.

For further improvements of the turbocharger according to the invention additional optional advantageous features can be provided, including various axial and radial clearances and various sealing elements.

Although in the embodiment shown in the Figures, the exhaust housing encloses completely the cartridge of the variable nozzle device and the peripheral ring thereof is axially aligned with the flange member of the exhaust housing so that both the peripheral ring and the flange member can be abutted against one and the same radially extending sealing member 55 supported on a flange portion of the center housing, other modifications or configurations of the mounting arrangement for the variable nozzle device cartridge and the exhaust housing to the center housing are possible. For example, with the locking dowel 24, bolts 21 may be eliminated and the complete variable nozzle device coupled to the center housing by use of indirect contact provided by fastening member 49.

Another possibility for coupling the variable nozzle device to the center housing is the use of interference fit. For this purpose the periphery of the center housing can be provided with an inner recess in which the peripheral ring 13 engages.

Similarly, although the embodiment shown in the Figures depicts the variable nozzle device as including a nozzle ring 23 fitted for carrying a plurality of vane pins 25 arranged on the nozzle ring circumferentially around the turbine 5 and fixedly mounted to pivoting vanes 27, other modifications or configurations of the variable nozzle device are possible. For example, the vanes could be of the known varieties of vane that control the exhaust gas flow by sliding radially and/or axially rather than, or in addition to, using a pivoting motion.

Due to the use of a separate variable nozzle device cartridge the manufacturing of the exhaust housing can be simplified. The exhaust housing can be for example produced of a sheet metal or by a simplified casting method, for example by thin casting technology using lower grades of exhaust housing material.

The invention claimed is:

1. A turbocharger comprising a center housing, a variable nozzle device, and an exhaust housing being mechanically and/or thermally decoupled from the variable nozzle device, wherein the variable nozzle device comprises a circumferential arrangement of vanes interposed between a nozzle ring and an outer ring integrally formed with a peripheral ring fitted on said nozzle ring and coupled to said center housing, wherein the peripheral ring is radially and axially spaced from the exhaust housing, so that any contact between the exhaust housing and the peripheral ring is avoided at all locations.

2. The turbocharger of claim 1, wherein said exhaust housing is mounted directly to a center housing carrying a shaft with a turbine wheel, so that both housings define an inner space in which said variable nozzle device and said turbine wheel are located.

3. The turbocharger of claim 2, wherein said exhaust housing comprises a gas inlet portion attached to said center housing and a gas outlet portion encompassing with an axially extending clearance a gas outlet portion of the variable nozzle device.

4. The turbocharger of claim 3, wherein the gas inlet portion of the exhaust housing comprises a flange member axially abutted via a sealing element to the center housing and mounted thereto by a fastening member.

5. The turbocharger of claim 3, further comprising a sealing system for avoiding a gas leakage between the exhaust housing and the variable nozzle device.

6. The turbocharger of claim 5, wherein the sealing system comprises a circumferential recess formed in said gas outlet portion of the variable nozzle device and containing a piston ring, characterized by at least one further circumferential recess formed in said gas outlet portion of said exhaust housing and opened to said axially extending clearance between the gas inlet side of said exhaust housing and the piston ring.

7. The turbocharger of claim 1, wherein said vanes are pivotally supported on the nozzle ring, said nozzle ring being axially urged by the peripheral ring against an annular disc member supported on said center housing.

8. The turbocharger of claim 1, wherein said gas inlet portion of the exhaust housing encompasses with a further axially extending clearance the peripheral ring of said variable nozzle device.

9. The turbocharger of claim 1, wherein said peripheral ring is abutted against the same sealing element via which the flange member of the exhaust housing is secured on the center housing.

10. The turbocharger according to claim 1, further comprising an insert comprising the peripheral ring and an outer ring.

\* \* \* \* \*